United States Patent
Chellamuthu et al.

(10) Patent No.: US 7,982,447 B2
(45) Date of Patent: Jul. 19, 2011

(54) SWITCHED MODE POWER SUPPLY HAVING IMPROVED TRANSIENT RESPONSE

(75) Inventors: Shanmuganand Chellamuthu, Richardson, TX (US); James A. Kohout, Dallas, TX (US); Luthuli E. Dake, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 407 days.

(21) Appl. No.: 12/335,255

(22) Filed: Dec. 15, 2008

(65) Prior Publication Data

US 2009/0206810 A1 Aug. 20, 2009

Related U.S. Application Data

(60) Provisional application No. 61/013,497, filed on Dec. 13, 2007, provisional application No. 61/013,058, filed on Dec. 13, 2007.

(51) Int. Cl.
G05F 1/40 (2006.01)
(52) U.S. Cl. ........................................ 323/285; 323/282
(58) Field of Classification Search .......... 323/222–225, 323/268, 271, 282, 284, 285
See application file for complete search history.

(56) References Cited

U.S. PATENT DOCUMENTS

| 6,060,869 | A | * | 5/2000 | Shimoda | 323/271 |
| 6,118,262 | A | * | 9/2000 | Suzuki | 323/313 |
| 2009/0096437 | A1 | * | 4/2009 | Wei | 323/299 |
| 2010/0134085 | A1 | * | 6/2010 | Nishida | 323/285 |

* cited by examiner

*Primary Examiner* — Matthew V Nguyen
(74) *Attorney, Agent, or Firm* — William B. Kempler; Wade J. Brady, III; Frederick J. Telecky, Jr.

(57) ABSTRACT

A switched mode power supply has a high side switching transistor coupled between a voltage source and a load for generating the output voltage at the load. A driver circuit drives the high side switching transistor. A first resistor divider is coupled to the output voltage and has a first tap. An error amplifier has a first input coupled to the first tap and a compensated feedback loop. A second resistor divider is coupled to the output voltage and has a second tap, resistance of the second resistor divider being less than resistance of the first resistor divider. A switch is coupled to the second tap and to the first input of the error amplifier for connecting the second tap to the first input of the error amplifier when the output voltage of the switched mode power supply reaches a first predetermined voltage.

20 Claims, 7 Drawing Sheets

SWITCHED MODE POWER SUPPLY HAVING IMPROVED TRANSIENT RESPONSE

CROSS-REFERENCE TO RELATED APPLICATIONS

This application claims the benefit of U.S. Patent Application Ser. No. 61/013,497 entitled "Transient Response Improvement Method for SMPS Voltage Regulators" and U.S. Patent Application Ser. No. 61/013,508 entitled "Sampled Data Circuits for Design of Automotive Integrated Power System Module", both filed on Dec. 13, 2007, which are incorporated herein by reference in their entirety.

FIELD OF THE INVENTION

This invention relates to a switched mode power supply and more specifically to a switched mode power supply voltage regulator having an improved transient response.

BACKGROUND OF THE INVENTION

Switched mode power supplies are a common form of voltage regulator that is widely used because of its higher efficiency than linear regulators. This is especially true when there is a wide disparity between input and output voltages. For example, in an automotive environment, the input voltage can go as high as 40 volts whereas the output voltage may be only 1.8 volts to power an integrated circuit, for example. The utilization of a switch mode power supply for this purpose not only reduces the energy consumption from the regulator, but also produces a concurrent reduction in the amount of heat that needs to be dissipated.

Figure 1:
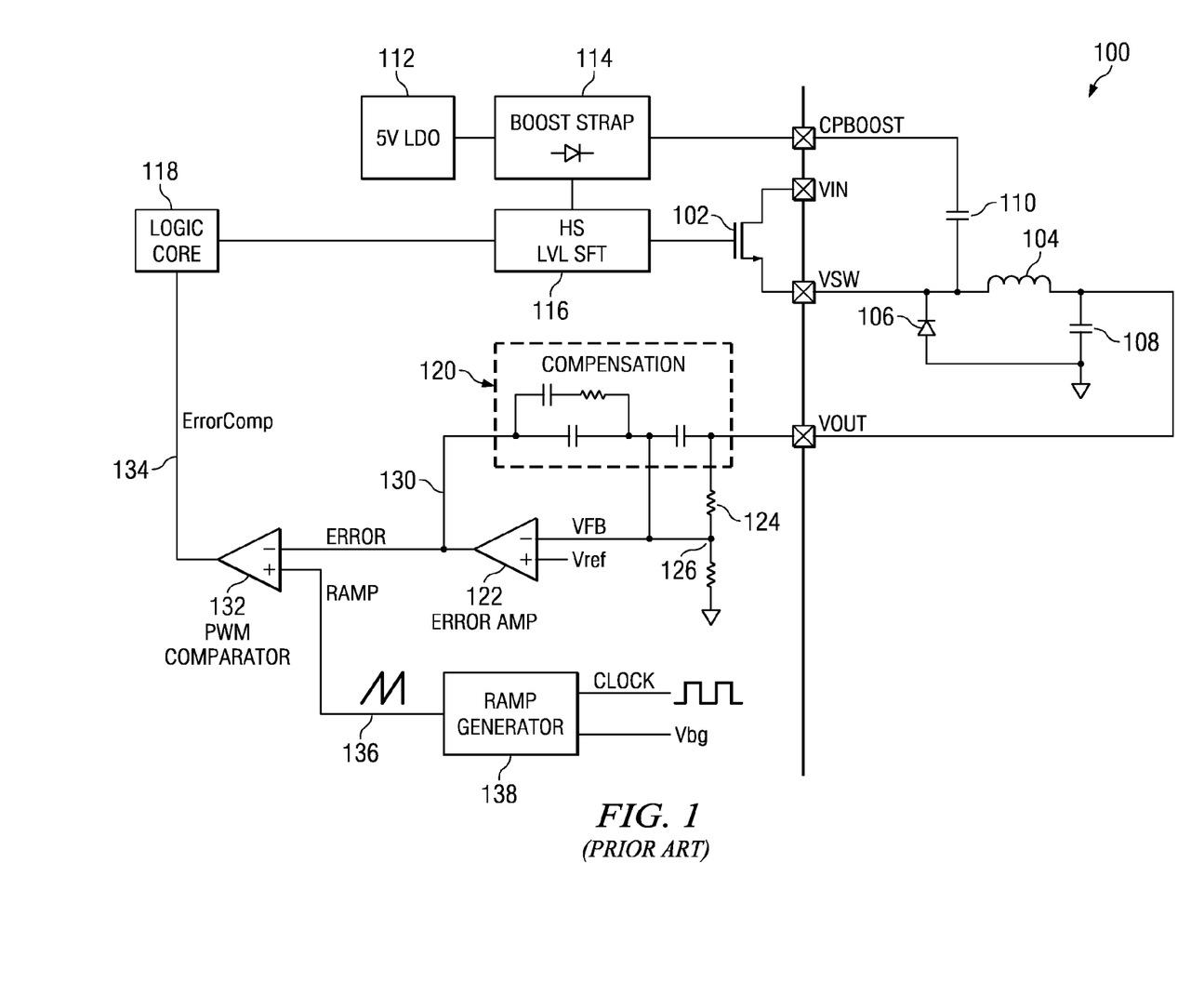
FIG. 1 is a schematic block diagram of a known switched mode power supply.

FIG. 1 illustrates a known type of switched mode power supply suitable for this purpose, for example, generally shown as 100. This regulator has a switching transistor 102 coupled between a source of power and an input to an inductor 104. A capacitor 108 is coupled between the output of the inductor and ground and a free wheeling diode 106 is coupled between the input to the inductor and ground, as is well known in the art. The switching transistor 102 utilized in the regulator 100 in the shown embodiment is a NMOS transistor. Accordingly, a level shift in circuit 116 is utilized to produce a higher voltage than the input voltage in order to produce the proper drive for an NMOS transistor. In this particular case, the output of a voltage regulator 112 is utilized by a bootstrap circuit 114 and a capacitor 110 coupled between the bootstrap circuit and the input to the inductor 104, in an known matter. The output of the bootstrap circuit 114 is utilized to produce the higher voltage in the level shifting circuit 116 to generate the proper drive for the NMOS transistor 102.

The switching transistor 102 is driven in accordance with signals generated by the logic core circuit 118 which responds to the output of an error comparator 132 comparing a ramp signal 136 generated by ramp generator 138 with the output of error amplifier 122. The ramp signal 136 is generated by charging a capacitor utilizing the reference voltage $V_{BG}$, which may be a bandgap voltage, for example. The capacitor is then discharged in accordance with the clock signal applied to the input of the ramp generator 138, as is well known in the art. The ramp signal is compared by 132 with the output of error amplifier 122. Error amplifier 122 compares a portion of the output voltage VOUT via a tap 126 on resistor divider 124 with a reference voltage $V_{REF}$ to produce error voltage on line 130 coupled to the inverting input of comparator 132. The times when the ramp voltage exceeds the error voltage determines when the switching transistor 102 will be turned on. The error amplifier 132 is compensated by compensation circuit 120 which comprises three capacitors and three resistors, two of which are the resistor chain in the resistor divider 124, to assure stability of. the amplifier 122. In many designs, the compensation network and the resistor divider are outside of the integrated circuit and are therefore comprise discrete components. There is a desire to integrate these components within the integrated circuit in order to reduce the size and cost of the circuit. As is well known to those skilled in the art, integrated capacitors take up a substantial portion of the real estate of an integrated circuit chip. Therefore, there is a desire to make these capacitors as small as possible. This means, in order to maintain the time constants, the resistors must be increased in value. Higher value resistors take up much less room on the integrated circuit than higher value capacitors, so that this is a good trade off with respect to saving the real estate. on the integrated circuit chip. However, the disadvantage of this approach is that the input node VFB becomes a relatively high impedance node and, during transient events, does not closely follow the output node. This results in poor regulation during of these events.

Figure 2:
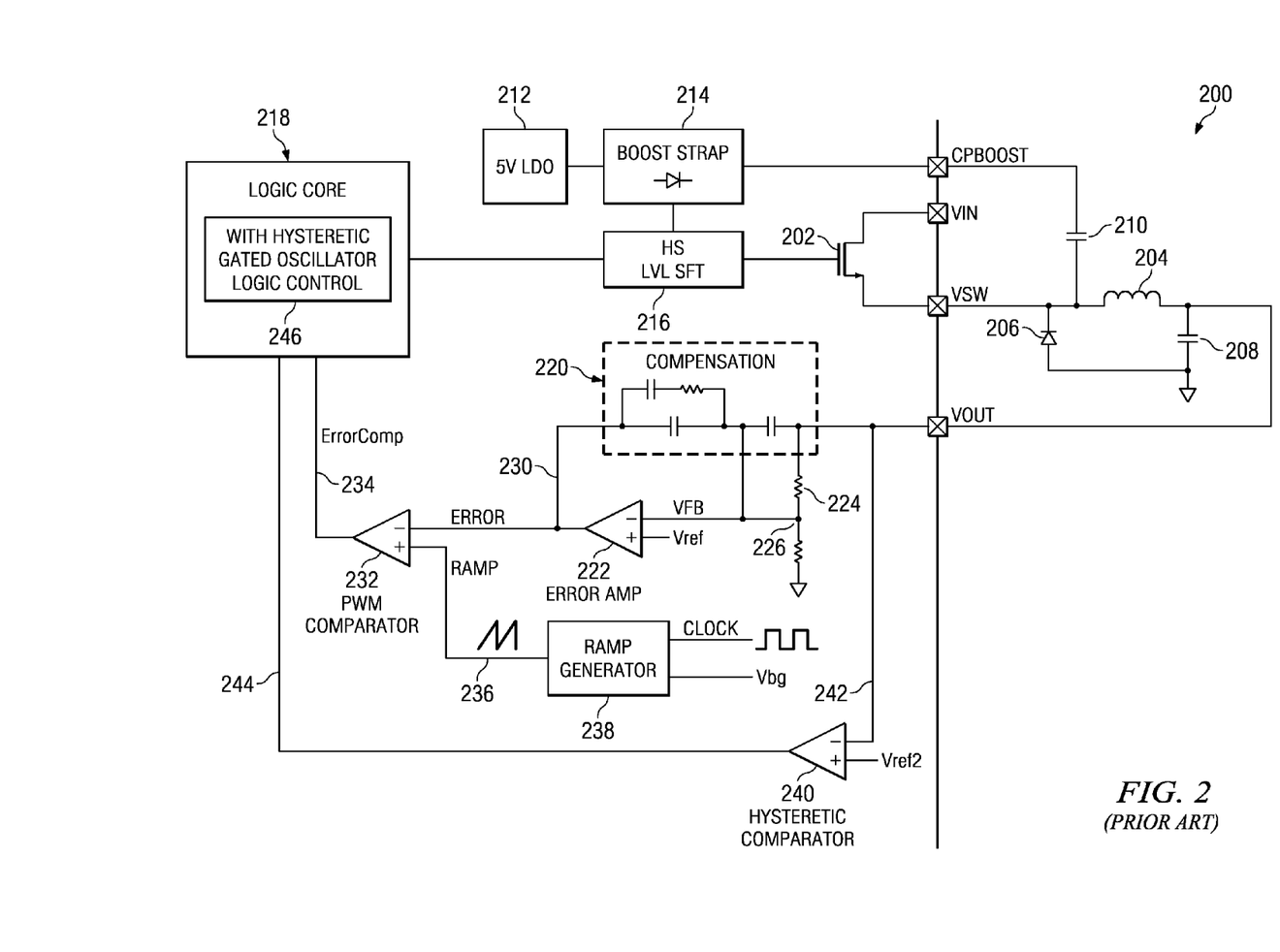
FIG. 2 is a schematic block diagram of a second known switched mode power supply, in which a hysteretic comparator is utilized to improve the transient response.

A known solution to this problem is shown in FIG. 2 generally as 200. In FIG. 2, elements shown in FIG. 1 have similar reference numerals to the reference numerals in FIG. 1. In FIG. 2, a hysteretic comparator 240 is added to the circuit shown in FIG. 1. The inverting input of this comparator is coupled to the output voltage VOUT and the noninverting input is coupled to a second reference $V_{REF2}$. The output of the hysteretic comparator 240 on line 244 is coupled to a separate control circuit 246 within the logic core 218 that controls the switching of transistor 202. When the output voltage falls below a preset voltage (under voltage) the high side switching transistor 202 is held on ignoring the output of the error amplifier 222. When the output voltage reaches a second predetermined voltage, higher than the first predetermined voltage hysteretic signal to, the high side switching transistor turns off so that the main control loop including ramp generator 238, error amplifier 222 and comparator 232 can take over. This solution provides a faster response to a transient then the solution shown in FIG. 1. However, the official loop is added in parallel to the main loop and this may make it difficult to compensate the main loop and in addition the hysteretic comparator might not let go of it's control after the transient event has terminated. In addition, because of external inductor variations, it is difficult to identify at the precise moment that the hysteretic comparator should be turned on or off, which may cause the output voltage to undershoot when the comparator turns the transistor on slightly slower. If the switching transistor 202 is not turned on in the right moment, the output voltage may overshoot it's intended value and that timing is dependent upon the current through the external inductor. Accordingly, more complex methods including forcing the on and off times of the transistor 202 may have to be added to the circuit which not only slow down the transient response of the regulator but greatly increased it's complexity.

Figure 3:
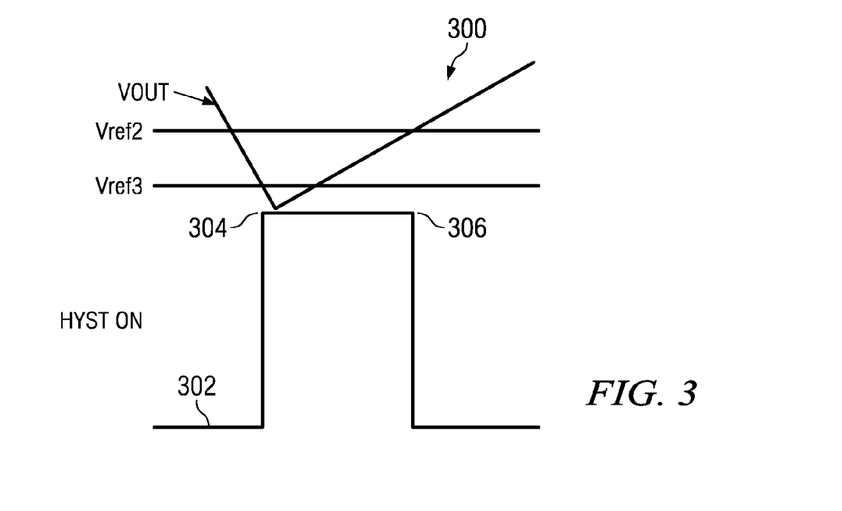
FIG. 3 illustrates the operation of the circuit shown in FIG. 2.

The operation of the hysteretic control loop is shown in FIG. 3 generally as 300. As shown by the waveform 302, when the output voltage drops below a predetermined voltage $V_{REF3}$ the hysteretic control will turn the switching transistor 202 on as shown at 304. However, when the output voltage exceeds the voltage reference $V_{REF3}$, the transistor stays on until the voltage increases to a second predetermined voltage $V_{REF2}$ and shown as 306.

Accordingly, there is a need for a switched mode power supply which can use integrated components for both the compensation and the voltage divider and still maintain fast transient response.

SUMMARY OF THE INVENTION

It is a general object of the present invention to provide a switched mode power supply having an improved transient response.

This and other objects and features are provided, in accordance with one aspect of the present invention by a switched mode power supply having an error amplifier coupled to an output voltage of the switched mode power supply and a compensated feedback loop. An input circuit comprises a first resistor divider has one end coupled to the output voltage and a tap coupled to an input of the error amplifier for providing a signal representative of the output voltage to the error amplifier during steady-state conditions. A second resistor divider has one end coupled to the output voltage and a tap for providing a signal representative of the output voltage during a transient condition, the second resistor divider having a lower resistance than the first resistor divider. A switch is coupled between the tap of the second resistor divider and the input of the error amplifier and coupling the tap of the second resistor divider to the input of the error amplifier during transient conditions.

Another aspect of the present invention includes a switched mode power supply having an output voltage and comprising a high side switching transistor coupled between a voltage source and a load for generating the output voltage at the load. A driver circuit drives the high side switching transistor. A first resistor divider is coupled to the output voltage and having a first tap. An error amplifier having a first input is coupled to the first tap and has a compensated feedback loop. A second resistor divider is coupled to the output voltage and has a second tap. The resistance of the second resistor divider being less than resistance of the first resistor divider. A switch is coupled to the second tap and to the first input of the error amplifier for connecting the second tap to the first input of the error amplifier when the output voltage of the switched mode power supply reaches a first predetermined voltage.

A further aspect of the present invention includes a method of operating a switched mode power supply having an error amplifier. One input of the error amplifier is coupled to tap of a first resistor divider coupled to an output voltage of the switched mode power supply. The input of the error amplifier is coupled to a tap of a second resistor divider coupled to the output voltage of the switched mode power supply during a transient load on the switched mode power supply, wherein the second resistor divider has a lower resistance than the first resistor divider.

DETAILED DESCRIPTION OF THE INVENTION

Figure 4:
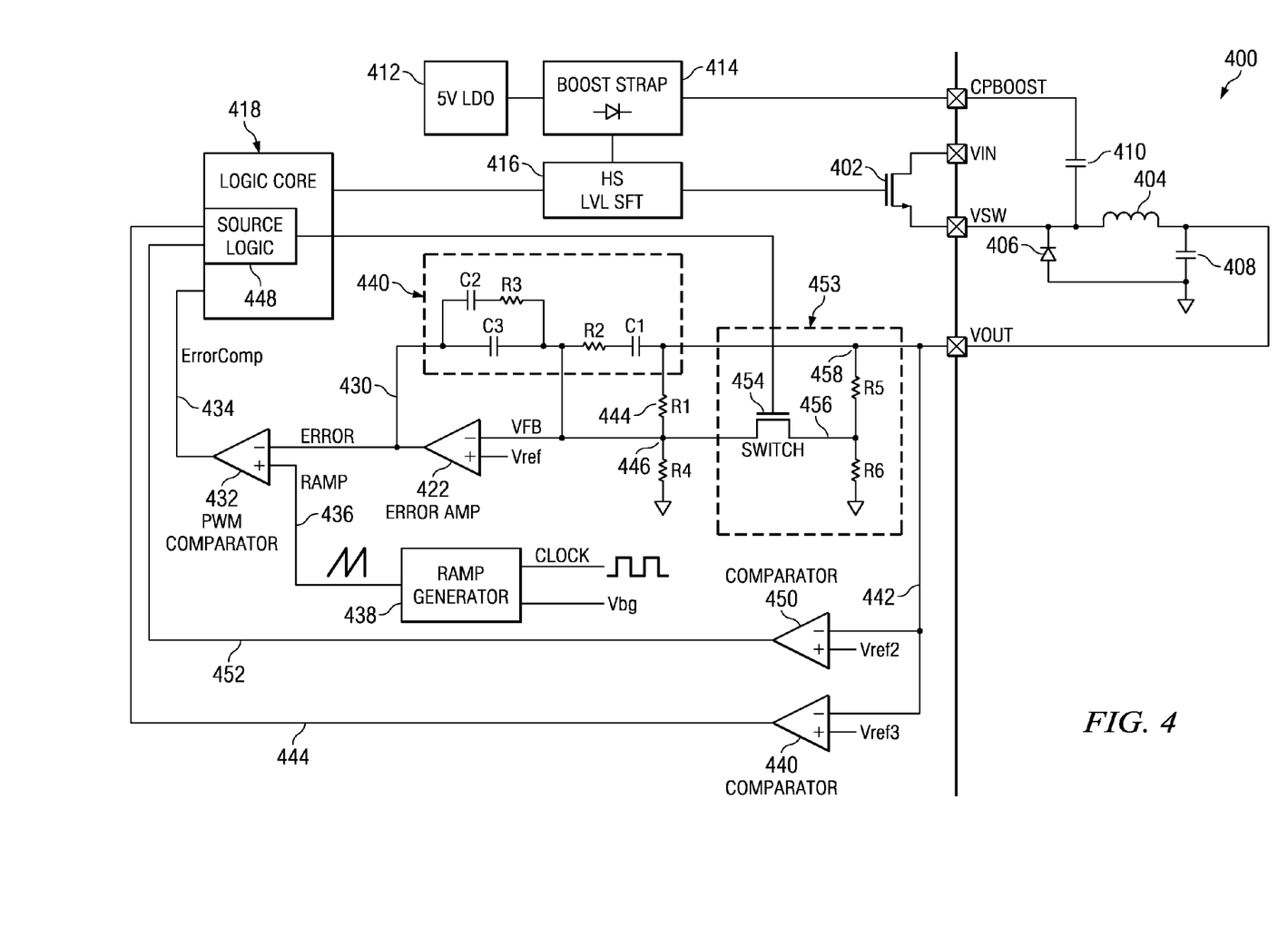
FIG. 4 is a schematic block diagram of a switch mode power supply in accordance with the present invention.

FIG. 4 shows a switched mode power supply in accordance with the present invention generally as 400. Elements found in the drawings for the embodiment of FIG. 1 or 2 have similar reference numerals in FIG. 4. A NMOS switching transistor 402 is coupled between a voltage source VIN and the input to an inductor 404, the other side of the inductor being coupled to ground via a capacitor 408. A free wheeling diode 406 is coupled between the input of the inductor and ground. The switching transistor 402, being a NMOS transistor requires a higher input voltage in order to provide the proper drive. This is provided by a level shifter 416 utilizing a higher voltage supply produced by bootstrap voltage generator 414 which is coupled to a capacitor 410, the second side of the capacitor being coupled to the input of conductor 404. The bootstrap circuit 414 takes the output of regulator 412 and produces a higher voltage utilized by the level shifter 416 to provide the appropriate drive for an NMOS transistor 402. The signals utilized to drive a switching transistor 454, are explained herein and below.

The logic core 418 responds to signals on line 434 from PWM comparator 432 which compares the output of a error amplifier 422 applied to the inverting input to a ramp generated by ramp generator 434 applied to the non-inverting input. The ramp can be generated, for example, by utilizing a voltage such as a band gap related voltage $V_{BG}$ to charge a capacitor and a clock signal to discharge the capacitor to generate a ramp signal on line 436.

The error amplifier 422 has a portion of the output voltage VOUT applied on the line VFB which is connected to the inverting terminal of error amplifier 422. The signal applied to the inverting input is derived from tap 446 of the resistor divider 444 which is coupled between the output voltage VOUT and ground. A feedback loop 430 is coupled between the output of error amplifier 422 and the connection point of the resistor divider 444 to the output voltage VOUT by a compensation network 440. This network comprises a capacitor C1 in series with a. resistor R2 which is in series with a second capacitor C3 coupled to the output of the error amplifier 422. Another capacitor C2 is in series with the resistor R3 which combination is in parallel with the capacitor C3. The node formed at the juncture of resistors R2 and R3 is coupled to the input VFB which is coupled to the inverting input of amplifier 422. The compensation network 440 which, in conjunction with the resistor divider 444, which includes resistors R1 and R4, form a type III compensated amplifier, which is known in the art. Accordingly, the calculation of the values utilized for the type III compensation need not be described herein. The non-inverting input of the amplifier 422 is connected to a reference voltage $V_{REF}$ which us utilized, along with the ratio of the resistors R1 and R4 to set the output voltage VOUT. In accordance with the desire to integrate as many components as possible, the components of the compensation network 440 and the resistor divider 444 may be included within the integrated circuit, thus eliminating the need for external components and thus reducing the size and cost of the resulting regulator circuit. Thus, in order to reduce the size of the capacitors C1, C2, and C3, the resistor values, R1 and R4 have been increased in order to maintain the time constant.

In view of the higher values of the resistors R1 and R4, a circuit 453 has been added in order to improve the transient response of the switch mode power supply. This circuit comprises switch 454 coupled the tap 456 of a second additional divider 458 to the inverting input of the error amplifier 422. The resistor divider 458 has a much lower resistance than the resistor divider 444 and may be one-fourth of the resistance of divider 444, for example. The ratio of the resistors R5 and R6 of resistance divider 458 is substantially the same as the resistors R1 and R4 in resistor divider 446. Thus, turning on transistor switch 454 lowers the resistance of the inverting input of error amplifier 422 and improves the transient response of the switched mode power supply. However, changing the resistance in this matter causes the error amplifier to become unstable, so that the lower value resistors cannot be allowed to be connected any longer than they are needed. As will be apparent when the operation of the switched mode power supply is discussed hereinbelow, the instability acts to drive the output voltage in the desired direction and therefore does not pose a stability problem, provided it can be turned off at the appropriate time. The switching transistor 454 is controlled by the output of sample logic circuit 448 found within the logic core 418.

A comparator 450 is used to generate a control signal on line 452 that is coupled to the sample logic 448 in order to operate the transistor 454. The comparator has an inverting input coupled to the output voltage VOUT and a non-inverting input coupled to a reference voltage $V_{ref}2$. When the output voltage drops below a predetermined threshold determined by a level of $V_{ref}2$, the comparator 450 generates a signal on line 452 which is utilized by a sample logic 448 to turn on switching transistor 454 which couples the voltage tap 456 on resistor divider 458 in parallel with tap 446 on resistor divider 444 to lower the input resistance so that the feedback node moves closely with the output node. This allows the regulator to provide a much greater control of the output voltage and greatly improves the transient response.

Also shown in FIG. 4 is optional hysteretic comparator 440 which has the inverting input coupled to the output voltage VOUT and it's non-inverting input coupled to a second reference $V_{ref3}$. The hysteretic comparator 440 functions similar to the hysteretic comparator 240 shown in FIG. 2 so that if the voltage falls below the level $V_{ref3}$, it will take control and operate the switch in transistor 402 in order to improve the transient response.

Figure 5A:
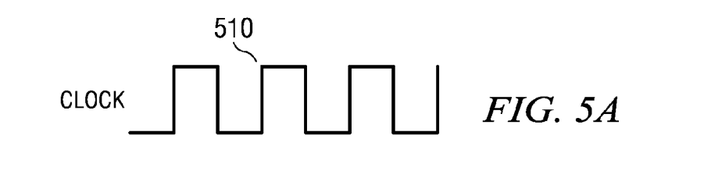
FIGS. 5A through 5F illustrate the signals used to operate the circuit shown in FIG. 4.
Figure 5B:
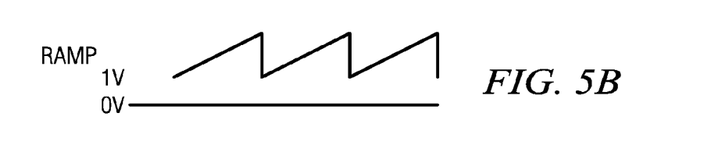
Figure 5C:
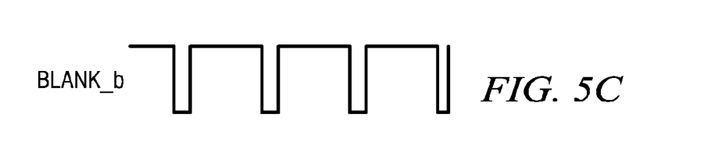
Figure 5D:
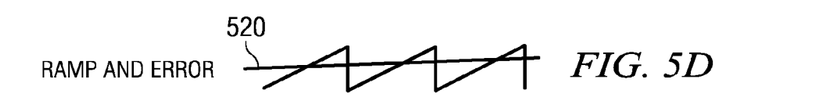
Figure 5E:
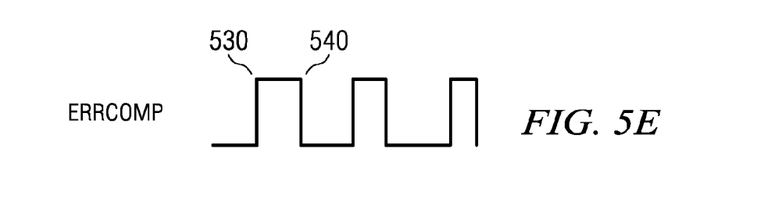
Figure 5F:
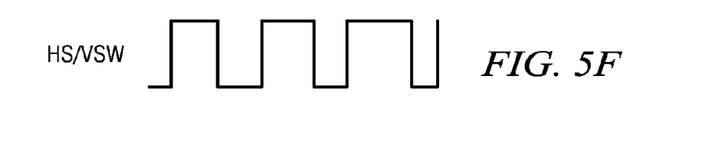

The waveforms shown in FIGS. 5A through 5F illustrate the signals utilized in the operation of the circuit shown in FIG. 4. The clock signal 5A is the clock signal input which rises at 510 into the ramp generator 438 which is utilized to discharge the capacitor charge by a signal related to VBG to generate the ramp signal shown in FIG. 5B. As can be seen by comparing FIGS. 5A and 5B, the ramp signal shown in FIG. 5B linearly increases until the rise of the clock signal shown in FIG. 5A when it returns to a starting point voltage. The signal shown in FIG. 5C is a signal utilized to blank the overcurrent protection at the start of the charging cycle because of the inrush current into the the inductor, so that it will not trigger the operation of the over current circuit. The signal shown in FIG. 5E is the output of comparator 432 which compares the error voltage output from error amplifier 422 with the ramp signal generated by ramp single generator 438. Whenever the ramp signal shown in FIG. 5D exceeds the error voltage 520, the error compensation signal shown in 5E rises as shown at 530, and whenever the ramp voltage goes below the error voltage, the error compensation signal goes low, as shown at 540. The signal shown in FIG. 5F is the signal applied to the high side transistor, which turns on at 510 rising edge and turns off at 530 rising edge of error comparator.

Figure 6A:
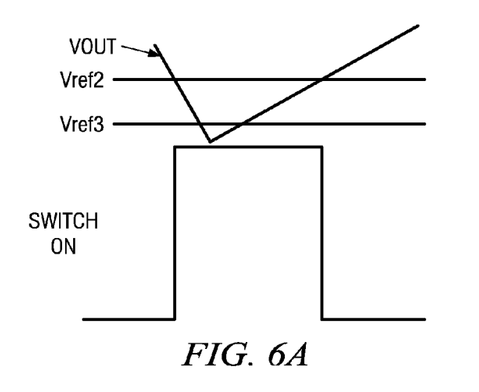
FIGS. 6A and 6B illustrate the operation of the circuit shown in FIG. 4.
Figure 6B:
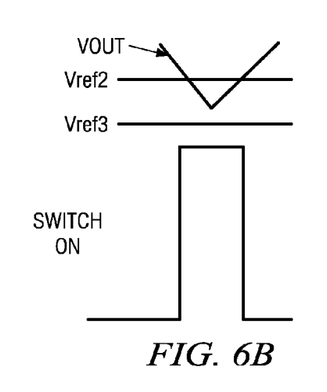

FIG. 6 illustrates the operation of the circuit shown in FIG. 4 in response to a transient on the output voltage. Here, when a voltage drops below a reference $V_{REF2}$, which may be 97.5% of the desired output voltage, for example, the switch on voltage goes high driving the output transistor on. The output transistor is turned off when the output voltage exceeds the $V_{REF2}$. In the case shown in FIG. 6A, the output voltage VOUT drops below a second reference voltage $V_{REF3}$, which may be 92.5% of the desired output voltage, for example, but this has no effect on the control to the switching transistor 402 in this embodiment, which does not utilize the hysteretic comparator 440 and the associated controls. The results shown in FIG. 6B is where the output voltage only drops below $V_{REF2}$ but does not drop below $V_{REF3}$. As can be seen, in this embodiment, the $V_{REF3}$ plays no role it is not utilized.

Figure 7A:
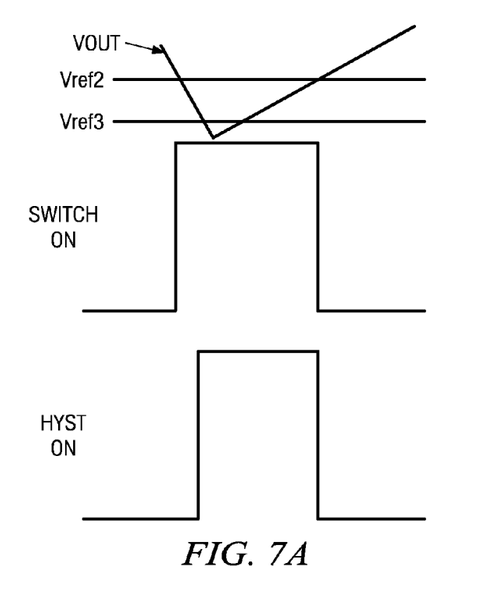
FIGS. 7A and 7B illustrate the operation of the optional hysteretic loop in the circuit shown in FIG. 4.
Figure 7B:
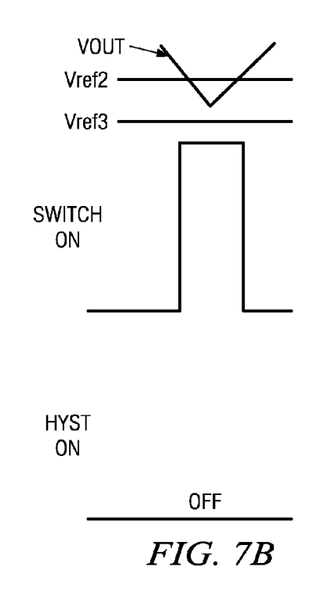

FIGS. 7A and 7B show the operation of the circuit when the optional hysteretic comparator 440 and the associated control circuitry is utilized. In this case, when the voltage VOUT drop below $V_{REF2}$, the switch is turned on and it turns off when the output voltage exceeds $V_{REF2}$. However, when the voltage drops below the second reference $V_{REF3}$, the hysteretic control is turned on and that control does not turn off until the voltage exceeds $V_{REF2}$. In the case shown in FIG. 7B, the output voltage does not drop below $V_{REF3}$, the switch on voltage is similar to that in 6B, and the hysteretic control does not turn on, as shown in FIG. 7B.

Figure 8A:
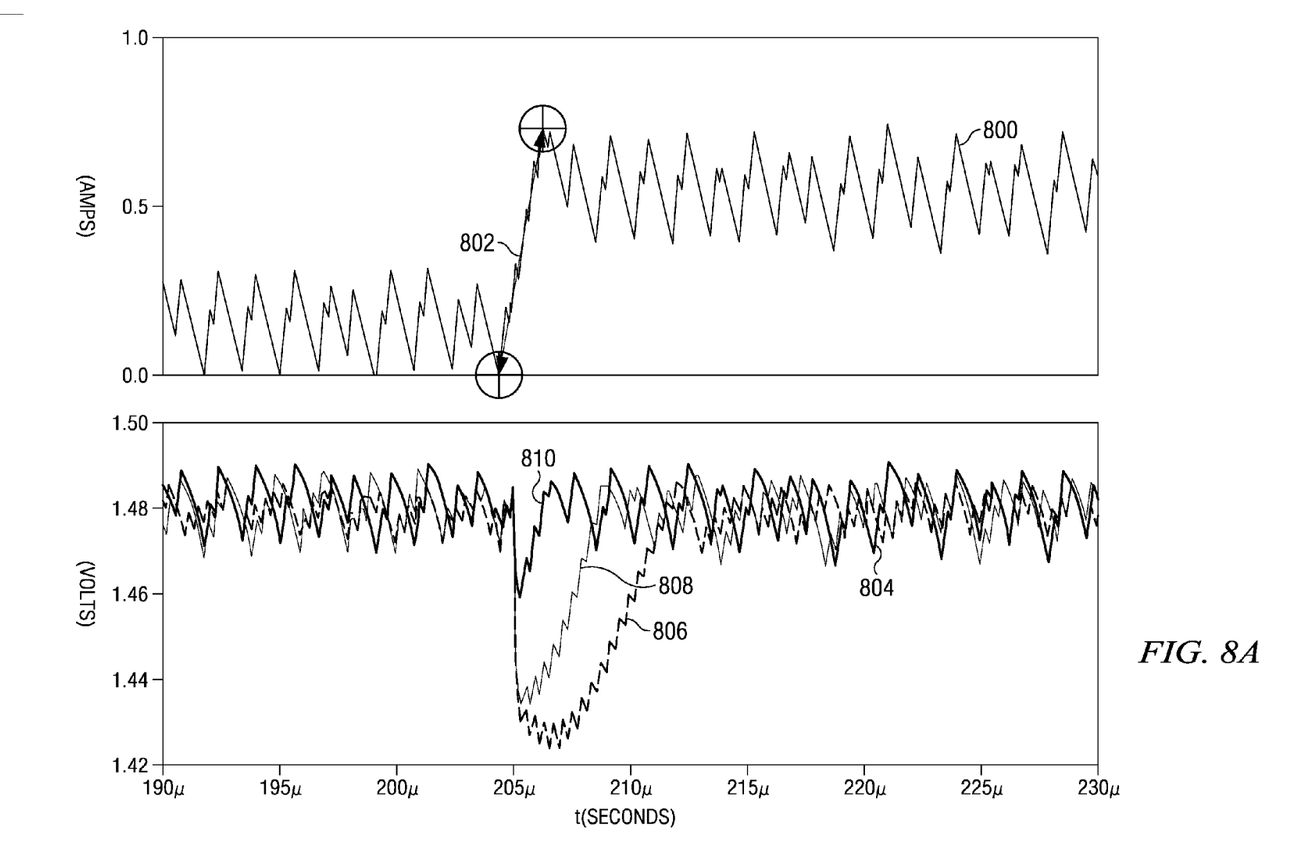
FIG. 8A shows the transient response of the present invention compared with the prior art.
Figure 8B:
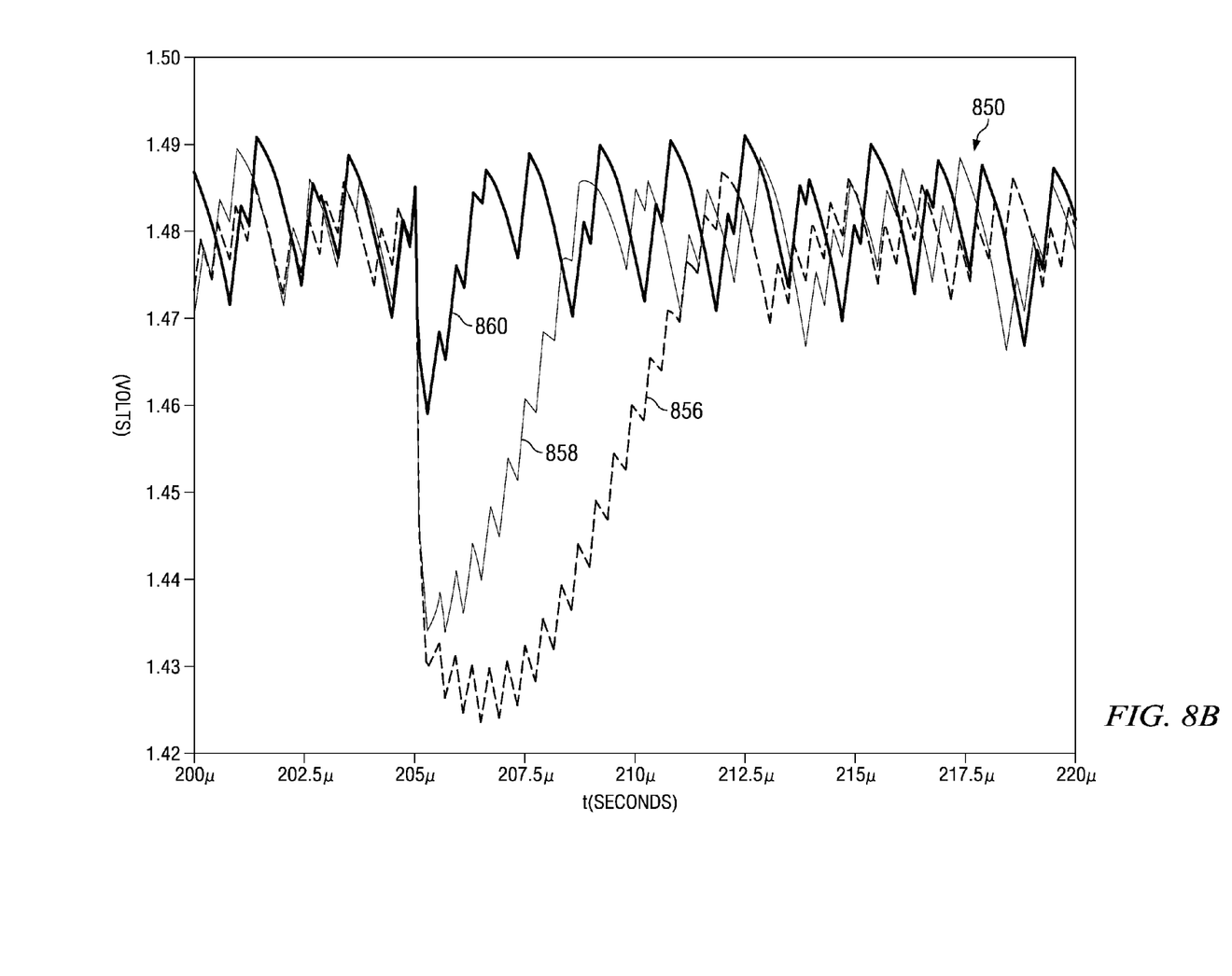
FIG. 8B is an enlarged view of the voltage response shown at the bottom of FIG. 8A.

FIGS. 8A and 8B illustrate the response of the present invention as compared with the prior art switched mode power supplies. In FIG. 8A, the output current waveform 800 has a transient generally shown at 802. The inductor current increases from 0 to 732 mA in less than two microseconds. The output voltage 804 shows the output 806 from the conventional circuit shown in FIG. 1 and the output voltage 808 from a conventional circuit with hysteretic comparator in FIG. 2. The output voltage 810 shows the output voltage of the present invention without the optional hysteretic control. FIG. 8B shows a zoomed in picture on the transient in the output voltage waveform shown at the bottom of FIG. 8A. The output voltage 850 shows the transient response 856 of the circuit shown in FIG. 1, 858 of the circuit shown in FIG. 2, and 860 of the circuit shown in FIG. 4 utilizing the present invention without the optional hysteretic comparator. As can clearly been seen from the zoomed picture 8B, the output of the present invention recovers faster and has less overshoot of the prior art devices.

Although the present invention has been described with reference to specific embodiments, it is not limited to these embodiments and no doubt alternatives will occur to the skilled person that lie within the scope of the invention as claimed.

The invention claimed is:

1. In a switched mode power supply having an error amplifier coupled to an output voltage of the switched mode power supply and a compensated feedback loop, an input circuit comprising:
   a first resistor divider having one end coupled to the output voltage and a tap coupled to an input of the error amplifier for providing a signal representative of the output voltage to the error amplifier during steady-state conditions;
   a second resistor divider having one end coupled to the output voltage and a tap for providing a signal representative of the output voltage during a transient condition, the second resistor divider having a lower resistance than the first resistor divider;

a switch coupled between the tap of the second resistor divider and the input of the error amplifier and coupling the tap of the second resistor divider to the input of the error amplifier during transient conditions.

2. The input circuit of claim 1 wherein resistance ratio at the tap for the second resistor divider is substantially equal to the resistance ratio at the tap for the first resistor divider.

3. The input circuit of claim 1 wherein resistance of the second resistor divider is substantially one fourth resistance of the first resistor divider.

4. The input circuit of claim 2 wherein resistance of the second resistor divider is substantially one fourth resistance of the first resistor divider.

5. The input circuit of claim 1 wherein the compensated feedback loop comprises a type III compensation network.

6. The input circuit of claim 3 wherein the compensated feedback loop comprises a type III compensation network.

7. The input circuit of claim 6 wherein a time constant of the compensated feedback loop is shorter with the second resistor divider coupled to the input of the error amplifier than when the first resistor divider alone is connected to the input of the error amplifier.

8. The input circuit of claim 1 further comprising a comparator having one input coupled to the output voltage of the switched mode power supply and a second input coupled to a reference voltage, the comparator causing the switch to close when the output voltage drops to a predetermined voltage.

9. A switched mode power supply having an output voltage and comprising:
   a high side switching transistor coupled between a voltage source and a load for generating the output voltage at the load;
   a driver circuit for driving the high side switching transistor;
   a first resistor divider coupled to the output voltage and having a first tap;
   an error amplifier having a first input coupled to the first tap and a compensated feedback loop;
   a second resistor divider coupled to the output voltage and having a second tap, resistance of the second resistor divider being less than resistance of the first resistor divider; and
   a switch coupled to the second tap and to the first input of the error amplifier for connecting the second tap to the first input of the error amplifier when the output voltage of the switched mode power supply reaches a first predetermined voltage.

10. The switched mode power supply of claim 9 wherein a resistance ratio at the second tap is substantially equal to a resistance ration at the first tap.

11. The switched mode power supply of claim 9 wherein the resistance of the second resistor divider is substantially one fourth of the resistance of the first resistor divider.

12. The switched mode power supply of claim 10 wherein the resistance of the second resistor divider is substantially one fourth of the resistance of the first resistor divider.

13. The switched mode power supply of claim 9 wherein the compensated feedback loop comprises a type III compensation network.

14. The switched mode power supply of claim 13 wherein a time constant of the compensated feedback loop is shorter when the second resistor divider is coupled to the first input of the error amplifier than when the first resistor divider alone is connected to the first input of the error amplifier.

15. The switched mode power supply of claim 9 further comprising a first comparator having one input coupled to the output voltage of the switched mode power supply and a second input coupled to a first reference voltage, the first comparator causing the switch to close when the output voltage reaches the first predetermined voltage.

16. The switched mode power supply of claim 15 further comprising a second comparator having one input coupled to the output voltage of the switched mode power supply and a second input coupled to a second reference voltage, the second comparator causing the high side switching transistor to turn ON when the output voltage reaches a second predetermined voltage.

17. The switched mode power supply of claim 16 wherein the second predetermined voltage is less than the first predetermined voltage.

18. The switched mode power supply of claim 17 wherein the second comparator is a hysteretic comparator.

19. A method of operating a switched mode power supply having an error amplifier comprising:
   coupling one input of the error amplifier to a tap of a first resistor divider coupled to an output voltage of the switched mode power supply; and
   coupling the input of the error amplifier to a tap of a second resistor divider coupled to the output voltage of the switched mode power supply during a transient load on the switched mode power supply, wherein the second resistor divider has a lower resistance than the first resistor divider.

20. The method of claim 19 further comprising:
   comparing the output voltage of the switched mode power supply to a predetermined reference voltage; and
   closing a switch to couple the tap of the second resistor divider to the input of the error amplifier when the output voltage of the switched mode power supply reaches the predetermined reference voltage.

* * * * *

UNITED STATES PATENT AND TRADEMARK OFFICE
CERTIFICATE OF CORRECTION

PATENT NO. : 7,982,447 B2 Page 1 of 1
APPLICATION NO. : 12/335255
DATED : July 19, 2011
INVENTOR(S) : Shanmuganand Chellamuthu et al.

It is certified that error appears in the above-identified patent and that said Letters Patent is hereby corrected as shown below:

Title Page item 60

Under Related U.S. Application Data, please correct the provisional application No. for "61/013,058" to --61/013,508--.

Signed and Sealed this
Twenty-seventh Day of December, 2011

David J. Kappos
*Director of the United States Patent and Trademark Office*